United States Patent [19]

Scallon

[11] Patent Number: 5,334,997
[45] Date of Patent: Aug. 2, 1994

[54] FOOT-OPERATED COMPUTER CONTROL

[76] Inventor: David Scallon, R.R. 2, Parkersburg, Iowa 50665

[21] Appl. No.: 995,597

[22] Filed: Dec. 22, 1992

[51] Int. Cl.$^5$ .................................................. G09G 5/00
[52] U.S. Cl. ..................................... 345/167; 345/145
[58] Field of Search ............... 340/706, 709, 710, 711; 74/471 X, 478, 512; 273/148 B; 200/6 A, 86.5; 345/156, 157, 160, 163, 168, 145, 167

[56] References Cited

U.S. PATENT DOCUMENTS

| | | | |
|---|---|---|---|
| 3,560,629 | 2/1971 | Tucci | 74/478 |
| 4,488,146 | 12/1984 | Burchart | 340/711 |
| 4,513,235 | 4/1985 | Acklam et al. | 318/685 |
| 4,516,063 | 5/1985 | Kaye et al. | 318/685 |
| 4,595,070 | 6/1986 | Hodges | 340/710 |
| 4,817,950 | 4/1989 | Goo | 200/6 A |
| 4,917,516 | 4/1990 | Retter | 340/710 |
| 4,958,607 | 9/1990 | Lundberg | 123/399 |
| 5,021,771 | 6/1991 | Lachman | 340/711 |
| 5,049,079 | 9/1991 | Furtado et al. | 434/253 |
| 5,076,584 | 12/1991 | Openiano | 273/148 B |
| 5,148,152 | 9/1992 | Stueckle et al. | 340/706 |

FOREIGN PATENT DOCUMENTS 140832  3/1992  Japan.
0450611 7/1936  United Kingdom ............... 200/86.5

OTHER PUBLICATIONS

"IBM Technical Disclosure Bulletin" vol. 28 No. 11 Apr. 1986 p. 4763.

*Primary Examiner*—Richard Hjerpe
*Assistant Examiner*—Lun-Yi Lao
*Attorney, Agent, or Firm*—Andrus, Sceales, Starke & Sawall

[57] ABSTRACT

A foot-operated input device for use in combination with a computer includes a housing to which one or more track balls are mounted, and a series of switches mounted to the housing. The track balls are employed to control the position of the computer's cursor, cross hair or the like in response to an operator's foot movements. The switches are also actuated in response to the operator's foot movements, and function in the same manner as switches associated with a mouse. Alternatively, the switches can be employed to provide other inputs to the computer, such as programmable macro inputs, ASCII inputs or the like.

18 Claims, 2 Drawing Sheets

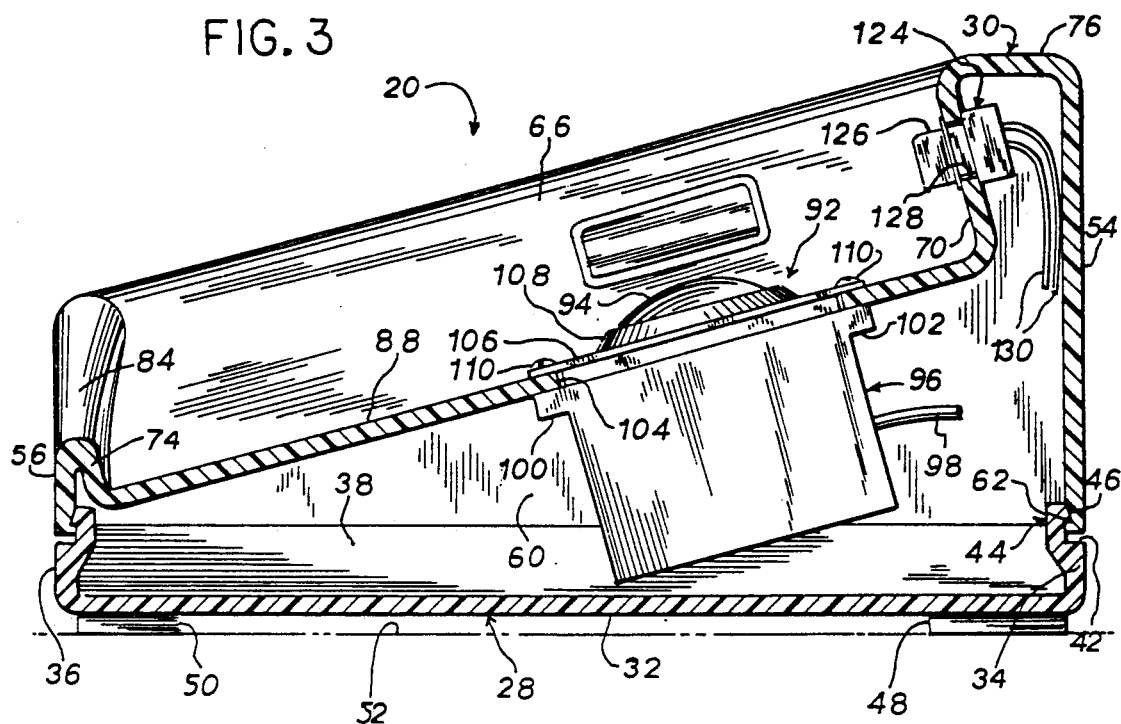

FOOT-OPERATED COMPUTER CONTROL

BACKGROUND AND SUMMARY

This invention relates to computer peripheral devices, and more particularly to a remote device for controlling position of a cursor or otherwise providing an input to the computer.

It is common in the computer industry to employ hardware and software which utilizes control of the computer's cursor to control the functioning of the computer. A cursor control device is commonly referred to as a mouse. Most hardware manufacturers provide capacity in their equipment for use of a mouse, and the cursor control provided by a mouse is commonly employed in software applications. For example, a mouse is used for cursor control applications in icon-based software of any kind, and is extensively utilized in computer controlled graphics applications.

Typically, a mouse is located in the vicinity of the computer. Most commonly, the mouse is supported on the same horizontal surface which supports the computer, and a pad is often positioned between the support surface and the mouse for preventing slippage of the track ball during movement of the mouse. Alternatively, the mouse can be supported by a specialized pull-out shelf mounted below the computer mounting surface. In either event, the mouse is operated by the user's hand by moving the mouse in a desired direction on the surface supporting the mouse, to control the position of the computer's cursor. This requires the operator to remove his or her hand from the computer's keyboard whenever it is desired to change the position of the cursor. When the cursor has been positioned as desired the operator returns his or her hand to the keyboard to resume operation of the computer.

The operator's hand movements away from the keyboard to the mouse, and back to the keyboard from the mouse, involve a certain amount of time and disruption in operation of the computer.

It is an object of the present invention to provide a device for simplifying positioning of the computer's cursor, or providing any other input to the computer, without requiring the operator to remove his or her hands from the keyboard. It is a further object of the invention to provide a device which prevents disruption in operation of the computer when it is desired to provide an input to the computer, such as to change the position of the computer's cursor. It is a further object of the invention to provide a unique method of controlling the position of a computer's cursor, to simplify operation of the computer and to make computer operation more efficient.

In accordance with one aspect of the invention, the invention contemplates a combination consisting of a computer for use by an operator, and a foot-operated control for controlling operation of the computer by providing an input to the computer, such as controlling the position of the computer's cursor, in response to movement of one or more of the operator's feet. The foot-operated control includes a housing located below the computer in the vicinity of at least one of the operator's feet, and one or more control elements mounted to the housing and interconnected with the computer. The one or more control elements include a switch and a track ball for controlling the position of the computer's cursor. The housing includes a lower wall which defines an upwardly facing surface, and the track ball is mounted to the lower wall so as to extend above the upwardly facing surface of the lower wall. The housing further includes one or more side walls extending upwardly from the lower wall, and a switch is mounted to at least one of the side walls. In one form, the housing defines a pair of spaced parallel side walls extending upwardly from opposite sides of the lower wall, with the track ball and the lower wall located between the pair of spaced side walls. A switch is mounted to each of the pair of spaced side walls, and the switches are positioned on the side walls substantially opposite each other, such that the track ball pivot point is in alignment with the switches. The housing further includes a forward wall extending between the pair of spaced side walls, and a switch is mounted to the forward wall. The lower wall defines a forward end and a rearward end, and is constructed such that the forward end is elevated above the rearward end, so that the lower wall is angled toward and faces the operator. The housing consists of an upper section and a lower base section interconnected together, and the lower wall makes up a portion of the upper section. The base section is adapted to engage a supporting surface, such as a floor, below the computer. The upper section and lower base section of the housing cooperate to define a housing interior. A track ball mounting arrangement is interconnected with the lower wall of the housing upper section and is located within the housing interior, for mounting the track ball to the lower wall.

In one form of the invention, a second track ball is mounted to the housing and interconnected with the computer. The housing includes a pair of coplanar lower walls, each of which defines an upwardly facing surface. The lower walls are separated by an upstanding wall, and a track ball is mounted to each lower wall so as to extend above the upwardly facing surface of each lower wall. A pair of switches are mounted to the upstanding wall which separates the coplanar lower walls. A first one of the switches faces one of the track balls, and a second one of the switches faces the other track ball. Side walls extend upwardly from both lower walls, spaced from the upstanding wall which separates the lower walls, and each track ball is located between the upstanding wall and one of the side walls. A switch is mounted to each of the side walls, such that the switches are in alignment with each other and with the pivot points of the first and second track balls. A front wall extends between the upstanding wall separating the coplanar lower walls and the spaced side walls, and a switch is mounted to each front wall.

The invention further contemplates a method of controlling operation of a computer by an operator. The method broadly consists of positioning a control for the computer below the computer in the vicinity of one or more of the operator's feet, with the control including a track ball and a switch interconnected with the computer. The control is operated by use of one or more of the operator's feet acting on the track ball and the switch, for controlling operation of the computer in response to the operator's foot movements. The details of the method contemplated by the invention are substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 3 is a section view taken along line 3—3 of FIG. 2; and

FIG. 4 is an isometric view of an alternative embodiment for the foot-operated computer control of the invention.

DETAILED DESCRIPTION OF THE INVENTION

Figure 1:
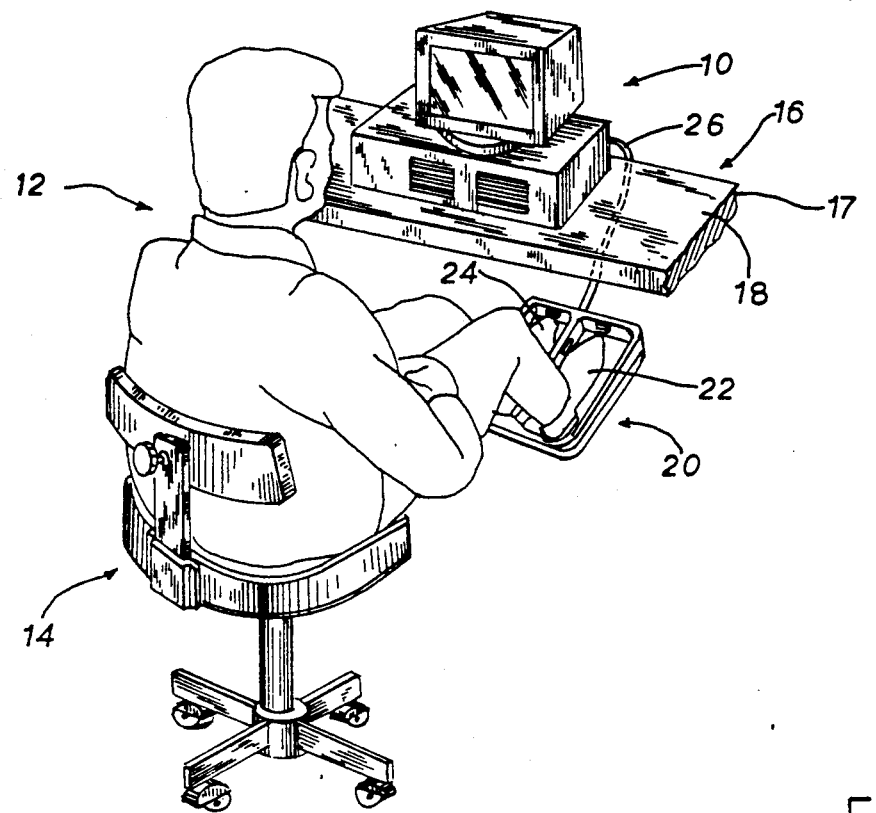
FIG. 1 is an isometric view showing a computer, an operator, and a foot-operated control constructed according to the invention for controlling or providing an input to the computer in response to the operator's foot movements.

FIG. 1 illustrates a computer 10 for use by an operator 12. Typically, operator 12 operates computer 10 while seated in a chair 14. Computer 10 is supported by a table 16 having a top 17 defining a horizontal upper surface 18. As in any computer work station setup, table top 17 is at an elevation above the floor on which chair 14 is supported, so that the legs of operator 12 can be positioned under table 16 when operator 12 faces computer 10 while seated on chair 14.

In accordance with the invention, a foot-operated control 20 is positioned below computer 10 and table 16 in the vicinity of the operator's feet, shown at 22, 24. Control 20 is placed on the floor below computer 10 and table 16, forwardly of chair 14 and operator 12 when seated therein. Foot-operated control 20 is interconnected with computer 10 by a multi-wire cable 26.

Figure 2:
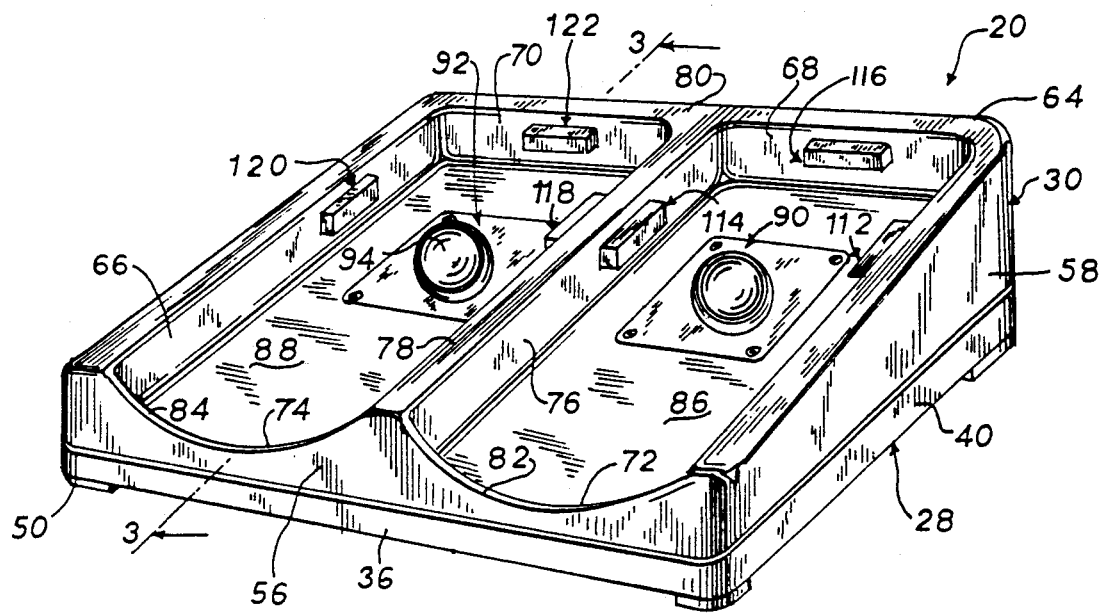
FIG. 2 is an isometric showing the foot-operated control of FIG 1.

Referring to FIGS. 2 and 3, foot-operated control 20 includes a base section 28 and an upper section 30 interconnected together. Referring to FIG. 3, base section 28 defines a lower wall 32 and upstanding front, rear, left and right side walls shown at 34, 36, 38 and 40 (FIG. 2), respectively. A shoulder, such as shown at 42, is provided at the upper end of each of walls 34–40, extending about the upper periphery of base section 28. A flange, such as shown at 44, extends upwardly from each shoulder, such as 42, again extending about the entire upper periphery of base section 28. Each flange, such as 44, includes an outward projection, such as shown at 46.

A series of foot pads, such as shown at 48, 50, are mounted to the underside of bottom wall 32, for supporting control 20 on a support surface, such as a horizontal floor 52.

Upper section 30 defines a vertical front outer wall 54, a vertical rear outer wall 56 and a pair of outer side walls 58, 60. A notch, such as shown at 62, extends horizontally along the inside surface defined by each of outer walls 54–60. The notch, such as 62, in each of outer walls 54–60 is adapted to receive the projection, such as 46 provided on the flange, such as 44, of each of walls 32, 34, 36 and 38 of base section 28. With this arrangement, upper section 30 and base section 28 are interconnected by a snap-together connection system provided by the notch and recess arrangement between the lower end of upper section side walls 54–60 and the flange provided on base section walls 34–40.

Housing upper section 30 further defines a pair of inner side walls 64, 66 spaced inwardly from outer side walls 58, 60, respectively; a pair of inner front walls 68, 70 spaced inwardly from outer front wall 54; a pair of inner rear walls 72, 74 spaced inwardly from outer rear wall 56; and a pair of inner central walls 76, 78. Inner central wall 78 is spaced from inner side wall 66 and extends between inner front wall 70 and inner rear wall 74. Likewise, inner central wall 76 is spaced from inner side wall 64, and extends between inner front wall 68 and inner rear wall 72. A top wall 80 interconnects the upper ends of outer and inner side walls 60, 66; the upper ends of outer and inner side walls 58, 64; the upper ends of outer front wall 54 with the upper ends of inner front walls 68, 70; and the upper ends of inner central walls 76, 78.

A concave upper wall 82 interconnects outer rear wall 56 with inner rear wall 72, extending between inner side wall 64 and inner central wall 76. Likewise, a concave upper wall 84 interconnects outer rear wall 56 with inner rear wall 74, extending between inner side wall 66 and inner central wall 78.

A lower wall 86 extends between and interconnects the lower ends of inner walls 64, 68, 72 and 76. Likewise, a lower wall 88 extends between and interconnects the lower ends of inner walls 66, 70, 74 and 78. Lower walls 86, 88 are coplanar.

Lower wall 86, and inner walls 64, 68, 72 and 76 cooperate to define a cavity or well dimensioned so as to receive the right foot 22 of operator 12. Similarly, lower wall 88 and inner walls 66, 70, 74 and 76 define a cavity or well adapted to receive the left foot 24 of user 12. Concave upper walls 82, 84 facilitate movement of the operator's feet 22, 24 into the areas above lower walls 86, 88, respectively.

Each of lower walls 86, 88 defines a forward end adjacent inner front walls 68, 70, respectively and a rearward end adjacent inner rear walls 72, 74, respectively. The forward end of each of lower walls 86, 88 is elevated relative to the rearward end of each wall, such that lower walls 86, 88 are angled toward and face operator 12 during operation of control 20.)

Referring to FIG. 2, a track ball assembly, shown generally at 90, is mounted to lower wall 86 and a track ball assembly, shown generally at 92, is mounted to lower wall 88. Track ball assemblies 90, 92 are substantially identical in construction and operation, and reference is made to FIG. 3 to illustrate the manner in which track ball assemblies 90, 92 are mounted.

As shown in FIG. 3, track ball assembly 92 includes a ball 94 mounted for rotation within a ball housing 96. Ball housing 96 houses internal components typically associated with a computer cursor control, such as linear encoders, for controlling the position of a computer's cursor in response to rotation of ball 94. Such components are well known in the art. The internal componentry of track ball assembly 92 is interconnected with computer 10 by a cable 98, through which signals are transmitted from track ball assembly 92 to computer 10 for controlling the position of the cursor of computer 10. Cable 98 is interconnected with and forms a part of multi-wire cable 26 (FIG. 1).

Ball housing 96 includes a pair of ears 100, 102 which engage the underside of lower wall 88 along opposite edges of an opening 104 formed in lower wall 88 through which track ball 94 extends. A plate 106 having a lip 108 defining a central opening is placed against the upper surface of lower wall 88, with track ball 94 extending through the opening defined by lip 108. A series of screws 110 extend through plate 106, lower wall 88 and into threaded openings provided in ears 100, 102 to mount track ball 94, plate 106 and ball housing 96 to lower wall 88. So mounted, track ball 94 extends above the upwardly facing surface of lower wall 88.

The various walls defined by upper section 30 and lower section 32 cooperate to define an internal cavity within which the track ball housings, such as 96, are located when track ball assemblies 90, 92 are mounted to lower walls 86, 88, respectively.)

Referring to FIG. 2, a momentary switch assembly 112 is mounted to inner side wall 64; a momentary switch assembly 114 is mounted to inner central wall 76; and a momentary switch assembly 116 is mounted to inner front wall 68. Similarly, a momentary switch assembly 118 is mounted to inner central wall 78; a momentary switch assembly 120 is mounted to inner side wall 66; and a momentary switch assembly 122 is mounted to inner front wall 70. Momentary switch assemblies 112-122 are substantially identical in construction and operation, and reference is made to FIG. 3 for a description of the manner in which momentary switch assembly 122 is mounted to inner front wall 70.

Referring to FIG. 3, momentary switch assembly 122 includes a switch housing 124 mounted to inner front wall 70 in any satisfactory manner, and a switch actuator 126 extends through an opening 128 formed in inner front wall 70. Switch housing 124 contains the internal components provided in a momentary switch of the type employed in a computer cursor control, as is known. Such internal components of switch housing 124 are interconnected with computer 10 by means of wires 130, which are interconnected with and form a part of multi-wire cable 26 (FIG. 1).

Switch assemblies 112, 114 are positioned on walls 64, 76, respectively so as to be substantially opposite each other, i.e. at approximately the same front-to-rear location on walls 64, 76. Switch assemblies 112, 114 are positioned such that the center of the track ball associated with track ball assembly 90 is in alignment with a line extending perpendicularly between walls 64, 76. Switch assemblies 118, 120 are similarly positioned on walls 78, 66, respectively. Switch assembly 116 is substantially centrally located on inner front wall 68, and switch assembly 122 is substantially centrally located on inner front wall 70.

In operation, with control 20 positioned on floor 52 below computer 10 and below table 16, operator 12 places his right foot 22 such that his heel engages lower surface 86, and places his left foot 24 such that his heel engages lower surface 88. The ball of foot 22 is thus located adjacent and engaging the track ball associated with track ball assembly 90, and the ball of foot 24 is located adjacent and engaging ball 94 of track ball assembly 92. In applications where a single cursor is provided by computer 10, operator 12 controls the cursor position by moving one of his feet side-to-side and front-to-back to pivot the track ball associated with one of track ball assemblies 90, 92. In double cursor applications, i.e. when computer 10 is provided with two cursors, the operator employs both feet to operate both of track ball assemblies 90, 92. Momentary switches 112-116 are employed in the same manner as momentary switches of a conventional mouse for selecting a menu item on which the cursor is placed, or any other similar function commonly performed by a momentary switch in combination with a computer.

FIG. 4 illustrates an alternative embodiment foot-operated computer control 130, which functions in substantially the same manner as foot-operated control 20 of FIGS. 1-3. As with control 20, control 130 is adapted for use with computer 10, and is positioned below table 16 in the vicinity of the operator's feet. Control 130 includes a housing defining a slanted lower surface 132, and a pair of track ball assemblies 134, 136 are mounted toward opposite ends of wall 132. Switch assemblies 138, 140, 142, 144, 146 and 148 are mounted to wall 132. Track ball assemblies 134, 136 function in a manner identical to track ball assemblies 90, 92 in the embodiment of FIGS. 1-3, to control the position of the cursor of computer 10. Switch assemblies 138-148 function in a manner similar to switch assemblies 112-122 in the embodiment of FIGS. 1-3. A multi-wire cable 150 interconnects control 130 with computer 10 to provide signals to computer 10 in response to operation of track ball assemblies 134, 136 and momentary switches 138-148.

While the invention has been described as a control for the cursor of computer 10, it is understood that input signals of any type can be supplied to computer 10 in response to operation of controls 20, 130. For example, controls 20, 130 can be employed to control the position of a cross hair, to provide ASCII inputs, standard keyboard inputs, programmable macro inputs, discrete switch inputs, and analog current or voltage inputs. Controls 20, 130 provide outputs such as EIA serial RS-232C, RS-422, EIA RS-45, analog current or voltage outputs, potentiometer, encoder-absolute or incremental, pulse train, standard keyboard interfaces, or discrete switches. Controls 20, 130 work in conjunction with any desk top device by time sharing input ports.

In addition, it should be understood that foot-operated controls 20, 130 can be employed to assist a handicapped person in operating a computer.

Various alternatives and embodiments are contemplated as being within the scope of the following claims particularly pointing out and distinctly claiming the subject matter regarded as the invention.

I claim:

1. In combination, a computer for use by an operator and including a cursor; and a foot-operated control for controlling operation of the computer in response to movement of one or more of the operator's feet, the foot-operated control including a foot-enclosing housing located below the computer for receipt of at least one of the operator's feet, and one or more control elements mounted to the housing and interconnected with the computer, the one or more control elements including a track ball positioned within the housing directly below the operator's foot for controlling the position of the computer's cursor and a plurality of switches positioned within the housing, said plurality including a switch on different sides of the housing to be engaged by lateral movement of the operator's foot.

2. The combination of claim 1, wherein the housing includes a lower wall defining an upwardly facing surface, and wherein the track ball is mounted to the lower wall so as to extend above the upwardly facing surface of the lower wall.

3. The combination of claim 2, further comprising a pair of spaced substantially parallel side walls extending upwardly from the lower wall, and wherein the switches are mounted to the side walls with the lower wall and the track ball located therebetween.

4. The combination of claim 3, wherein a switch is mounted to each of the pair of spaced substantially parallel side walls.

5. The combination of claim 3 including a forward wall, and further comprising a switch mounted to the forward wall.

6. The combination of claim 5, wherein the one or more side walls further include a pair of spaced substantially parallel side walls between which the forward wall extends, wherein a switch is mounted to each of the pair of spaced side walls.

7. The combination of claim 2, wherein the lower wall defines a forward end and a rearward end, and wherein the lower wall is oriented at an angle wherein the forward end is elevated above the rearward end, such that the lower wall is angled toward the operator.

8. The combination of claim 7, wherein the housing includes an upper section and a lower base section interconnected together, wherein the lower wall comprises a portion of the upper section, and wherein the base section is adapted to engage a supporting surface below the computer.

9. The combination of claim 8, wherein the upper section and the lower base section cooperate to define a housing interior, and further comprising a track ball mounting arrangement interconnected with the lower wall of the housing upper section and located within the housing interior for mounting the track ball to the lower wall.

10. The combination of claim 9, further comprising one or more side walls extending upwardly from the lower wall, and wherein a switch is mounted to one of the side walls.

11. The combination of claim 1, further comprising a second track ball mounted to the housing and interconnected with the computer.

12. The combination of claim 11, wherein the housing includes a pair of coplanar lower walls each defining an upwardly facing surface, wherein the lower walls are separated by an upstanding wall, and wherein a track ball is mounted to each lower wall so as to extend above the upwardly facing surface of each lower wall.

13. The combination of claim 12, wherein a pair of switches are mounted to the upstanding wall separating the coplanar lower walls, wherein a first one of the switches faces the first-mentioned track ball and a second one of the switches faces the second track ball.

14. The combination of claim 13, further comprising a second upstanding side wall extending upwardly from a first one of the lower walls and spaced from the first-mentioned upstanding wall, wherein the first-mentioned track ball is located between the second upstanding side wall and the first-mentioned upstanding wall; a third upstanding side wall extending upwardly from a second one of the lower walls and spaced from the first-mentioned upstanding wall, wherein the second track ball is located between the third upstanding side wall and the first-mentioned upstanding wall; and a switch mounted to each of the second and third upstanding side walls.

15. The combination of claim 14, wherein the switches mounted to the side walls are in alignment with each other and with the pivot points of the first-mentioned and second track balls.

16. The combination of claim 14, further comprising a first front wall extending between the second upstanding side wall and the first-mentioned upstanding wall, and a second front wall extending between the third upstanding side wall and the first-mentioned upstanding wall, and further comprising a switch mounted to each of the first-mentioned and second front walls.

17. A foot-operated control for use by an operator in combination with a computer having a cursor, comprising:
a housing located below the computer for receipt of at least one of the operator's feet;
one or more control elements within the housing and interconnected with the computer, including a track ball for controlling the position of the cursor and a plurality of switches, each switch on different sides of the housing;
wherein the track ball and the switches are operable by one of the operator's feet for controlling operation of the computer in response to the operator's foot movements.

18. A foot-operated control for use by an operator in combination with a computer having two cursors, comprising:
two foot-receiving housings located below the computer in the vicinity of the operator's feet;
a plurality of control elements mounted to each housing and interconnected with the computer, each plurality of elements including a track ball for controlling the position of one cursor and a plurality of switches, each switch on different sides of a respective housing;
wherein the track ball and the switches for each housing are operable by one of the operator's feet for independently controlling operation of the computer and one of the cursors in response to the operator's foot movements without affecting the operation and position of the other cursor.

* * * * *